(12) United States Patent
Kim et al.

(10) Patent No.: US 10,018,383 B2
(45) Date of Patent: Jul. 10, 2018

(54) TRIPLE EFFECT ABSORPTION CHILLER

(71) Applicants: SAMJUNG TECH CO., LTD., Seoul (KR); SOGANG UNIVERSITY RESEARCH & BUSINESS DEVELOPMENT FOUNDATION, Seoul (KR)

(72) Inventors: Hyo Sang Kim, Seoul (KR); Si Young Jeong, Seoul (KR); Sung Min Woo, Busan (KR); Su Yong Lee, Changwon-Si (KR)

(*) Notice: Subject to any disclaimer, the term of this patent is extended or adjusted under 35 U.S.C. 154(b) by 0 days.

(21) Appl. No.: 15/593,358

(22) Filed: May 12, 2017

(65) Prior Publication Data

US 2017/0328605 A1 Nov. 16, 2017

(30) Foreign Application Priority Data

May 13, 2016 (KR) .................. 10-2016-0058931
May 13, 2016 (KR) .................. 10-2016-0058938

(51) Int. Cl.
*F25B 15/00* (2006.01)
*F25B 41/04* (2006.01)
*F25B 49/04* (2006.01)

(52) U.S. Cl.
CPC ............ *F25B 15/008* (2013.01); *F25B 41/04* (2013.01); *F25B 49/043* (2013.01); *F25B 2315/005* (2013.01); *F25B 2600/2501* (2013.01)

(58) Field of Classification Search
CPC ...... F25B 15/008; F25B 49/043; F25B 41/04; F25B 2600/2501; F25B 2315/005;
(Continued)

(56) References Cited

U.S. PATENT DOCUMENTS 4,009,575 A * 3/1977 Hartman, Jr. ............ F01K 5/02
 60/648
5,033,274 A * 7/1991 Erickson ................. F25B 15/02
 62/476

(Continued)

FOREIGN PATENT DOCUMENTS

JP 3412012 B2 6/2003
JP 4056028 B2 3/2008
(Continued)

OTHER PUBLICATIONS

English abstract of JP3412012 B2.
(Continued)

*Primary Examiner* — Mohammad M Ali
(74) *Attorney, Agent, or Firm* — Antonio Ha & U.S. Patent, LLC

(57) ABSTRACT

The present invention relates to a triple-effect absorption chilling apparatus adopting a structure of an anti-parallel cycle in which an absorber and a first regenerator are connected in series, a second regenerator and a third regenerator are connected in parallel with the first regenerator, and the solution through the second regenerator and the third regenerator is returned to the absorber. Therefore, according to the present invention, it is possible to improve efficiency by acquiring a higher coefficient of performance than conventional absorption refrigerators, and to reduce energy consumption.

8 Claims, 3 Drawing Sheets

(58) Field of Classification Search
CPC ...... F25B 27/002; F25B 39/026; F25B 15/06; F25B 2500/07; F25B 2315/001; F25B 15/02; C01D 15/04
USPC .......................................................... 62/476
See application file for complete search history.

(56) References Cited

U.S. PATENT DOCUMENTS

| | | | | | |
|---|---|---|---|---|---|
| 5,727,397 | A | * | 3/1998 | He | F25B 15/008 62/476 |
| 5,946,937 | A | * | 9/1999 | Kujak | C09K 5/047 62/476 |
| 6,250,089 | B1 | * | 6/2001 | Serpente | F25B 15/008 62/101 |
| 2005/0138938 | A1 | * | 6/2005 | Halwan | F25B 49/043 62/148 |

FOREIGN PATENT DOCUMENTS

| | | | |
|---|---|---|---|
| JP | 4157723 | B2 | 10/2008 |
| JP | 4287705 | B2 | 7/2009 |
| JP | 4321318 | B2 | 8/2009 |

OTHER PUBLICATIONS

English abstract of JP4321318 B2.
English abstract of JP4157723 B2.
English abstract of JP4056028 B2.
English abstract of JP4287705 B2.

* cited by examiner

TRIPLE EFFECT ABSORPTION CHILLER

CROSS-REFERENCE TO RELATED APPLICATION

This application claims priority to Korean Patent Applications No. 2016-0058931 and 2016-0058938 filed on May 13, 2016, and all the benefits accruing therefrom under 35 U.S.C. § 119, the contents of which are herein incorporated b reference in their entireties.

BACKGROUND OF THE INVENTION

1. Field of the Invention

The present invention relates to a triple-effect absorption chilling apparatus. More particularly, the present invention relates to a triple-effect absorption chilling apparatus using external heat source and a triple-effect absorption chilling apparatus to improve the flow structure of the solution.

2. Description of the Related Art

The cold water used for the absorption cooling passes through the heat transfer tube of the evaporator, and dissipated by the evaporation latent heat of the refrigerant, and the cold water is cooled.

At this time, the generated refrigerant vapor flows into the absorber and is absorbed into the aqueous solution of lithium bromide. The absorption heat generated, when the refrigerant vapor is absorbed, is removed by the cooling water which flows in the heat transfer tube of the absorber. The pressure of the absorber and the evaporator is constantly maintained at 5 to 7 mmHg so that the refrigerant evaporating of the evaporator can be continuously maintained.

The aqueous solution of lithium bromide (hereinafter referred to as 'weak solution') absorbs the vapor of refrigerant in the absorber and gets diluted. The weak solution is heated through a low-temperature heat exchanger by a solution pump, a part of the solution is sent to a low-temperature regenerator, and the other part is heated by passing through the high-temperature heat exchanger and flows into a high-temperature regenerator.

The weak solution supplied to the high-temperature regenerator is heated by external heat such as gas, steam for generating a refrigerant vapor, and is concentrated into a concentrated solution (hereinafter referred to as 'strong solution').

The high-temperature refrigerant vapor generated flows into the heat transfer tube of the low-temperature regenerator.

Meanwhile, the weak solution introduced into the low-temperature regenerator by the solution pump is heated by the condensation latent heat of the refrigerant vapor in the heat transfer tube of the low temperature regenerator to generate the refrigerant vapor, and is concentrated into a medium-concentrated solution (hereinafter referred to as 'medium-concentrated solution').

The refrigerant vapor generated at this time and the refrigerant condensed in the heat transfer tube of the low temperature regenerator flow into the condenser. These are condensed by the cooling water flowing in the heat transfer tube of the condenser.

The condensed refrigerant flows into the evaporator by gravity and pressure difference to produce cold water required for cooling.

In the above-described double-effect cooling cycle, COP is known to have a limit of 1.3 at maximum and it is difficult to further increase the efficiency.

Many of the technologies including the "triple-effect absorption refrigerator" of Japanese Patent No. 4056028 (hereinafter referred to as "prior art"), which was invented in view of the above, further comprise medium temperature regenerator in addition to above-mentioned high temperature regenerator and low temperature regenerator to reduce the load of a whole equipment and reduce the operation time.

However, most of the triple-effect absorption refrigerators including the prior art have a limitation in that they are not commercialized due to their structural complexity and difficulty in improving the airtightness and safety of the high temperature regenerator at high temperature and high pressure.

Particularly, most of the triple-effect absorption refrigerators including the prior art have a problem that the power consumption is large and the installation cost is increased because a plurality of pumps and valves are provided for controlling the pressure and the flow rate.

The present invention has been made in order to solve the above-mentioned problems. According to the present invention, a triple-effect absorption chilling apparatus capable of improving efficiency by obtaining a higher coefficient of performance than conventional absorption chilling apparatus can be provided.

BRIEF SUMMARY

Exemplary embodiments of the present invention provide an apparatus for triple-effect absorption chilling.

In an exemplary embodiment, the apparatus may comprise: at least one evaporator; at least one absorber for absorbing refrigerant vapor generated from the evaporator to a dilute lithium bromide solution (hereinafter, referred to as 'weak solution'); a first regenerator connected in series with the absorber and comprising a first heat transfer tube therein, wherein the weak solution supplied from the absorber is heated by the condensation latent heat of the refrigerant vapor in the first heat transfer pipe, and concentrated to medium-concentrated solution which is a thicker concentrated solution than the weak solution; a second regenerator connected in series with the first regenerator and comprising a second heat transfer tube therein, wherein the medium-concentrated solution supplied from the first regenerator is heated by the condensation latent heat of the refrigerant vapor in the second heat transfer pipe, and concentrated to strong solution which is a thicker concentrated solution than the medium-concentrated solution; a third regenerator connected in series with the first regenerator and connected in parallel with the second regenerator and comprising a heat source therein, wherein the medium-concentrated solution supplied from the first regenerator is heated by the heat source, and concentrated to strong solution which is a thicker concentrated solution than the medium-concentrated solution; a first solution pump for supplying the weak solution from the absorber to the first regenerator; a first solution supply pipe connected to the discharge outlet of the first solution pump and forming a flow path for supplying the weak solution to the first regenerator; a first solution branch pipe branched from the first solution supply pipe and connected to a first solution inlet port of the first regenerator; a first branch point where a start end of the first solution branch pipe is branched from the first solution supply pipe; and a first junction point to which the end of the first solution supply pipe and the first solution branch pipe are connected, wherein the internal temperature of the third regenerator is higher than the internal temperature of the second regenerator, the internal temperature of the second regenerator is higher than the internal temperature of the first regenerator, a flow rate of the first weak solution flowing through the first solution supply pipe from the first branch point to the first junction point which is the end point is 10 to 20% of the flow rate of the weak solution discharged from the absorber, and a flow rate of the second weak solution flowing through the first solution branch pipe from the first branch point to the first solution inlet port which is the end point is 80 to 90% of the flow rate of the weak solution discharged from the absorber.

In an exemplary embodiment, the apparatus may further comprise: a second solution supply pipe connected from a first solution outlet port of the first regenerator to a second solution inlet port of the second regenerator; a second solution branch pipe branched from the second solution supply pipe and connected to a third solution inlet port of the third regenerator; and a first solution return pipe connected from a third solution outlet port of the third regenerator to the absorber, wherein the end of the first solution supply pipe is connected to the first solution branch pipe and joined together.

In an exemplary embodiment, the apparatus may further comprise: a first heat exchanger arranged on the first solution branch pipe between the first branch point and the first junction point, wherein the first solution return pipe passes through the first heat exchanger and the weak solution flowing through the first solution branch pipe and the solution discharged from the third regenerator mutually heat-exchange in the first heat exchanger; a second heat exchanger arranged on the second solution supply pipe, wherein the first solution return pipe passes through the second heat exchanger and the medium-concentrated solution flowing through the second solution supply pipe and the solution discharged from the third regenerator mutually heat-exchange in the second heat exchanger; and a third heat exchanger arranged on the second solution branch pipe, wherein the first solution return pipe passes through the third heat exchanger and the medium-concentrated solution flowing through the second solution branch pipe and the solution discharged from the third regenerator mutually heat-exchange in the third heat exchanger, wherein the internal temperature of the third heat exchanger is higher than the internal temperature of the second heat exchanger and the internal temperature of the second heat exchanger is higher than the internal temperature of the first heat exchanger, and the third heat exchanger, the second heat exchanger, and the first heat exchanger are arranged in sequence on the first solution return pipe from the third regenerator to the absorber.

In an exemplary embodiment, the apparatus may further comprise: a condensation refrigerant heat exchanger mounted on a refrigerant vapor discharge pipe passing through the third regenerator, the second regenerator, and the first regenerator sequentially to form a flow path for discharging a refrigerant vapor heated from the third regenerator and disposed between the condenser and the first regenerator, wherein the first solution supply pipe passes through the condensation refrigerant heat exchanger, and the fluid flowing in the refrigerant vapor discharge pipe and the fluid flowing in the first solution supply pipe mutually heat-exchange in the condensation refrigerant heat exchanger.

In an exemplary embodiment, the apparatus may further comprise: a second solution pump mounted on the second solution supply pipe between the first regenerator and the second heat exchanger and transferring the weak solution from the first solution outlet port to the second heat exchanger; a third solution pump mounted on the second solution supply pipe between the second heat exchanger and the second regenerator and transferring the medium-concentrated solution from the outlet of the second heat exchanger to the second regenerator; a second branch point branched from the second solution supply pipe and disposed between the second solution pump and the inlet of the second heat exchanger; a second solution return pipe forming a flow path for transferring a part of the medium-concentrated solution discharged from the second solution supply pipe to the absorber via the first heat exchanger, wherein one end of the second solution return pipe is connected to the second branch point and the other end of the second solution return pipe is connected to the first solution return pipe between the first heat exchanger (9) and the second heat exchanger; a third solution return pipe forming a flow path for transferring a part of the strong solution discharged from the second regenerator to the absorber sequentially through the second heat exchanger and the first heat exchanger, wherein the third solution return pipe is connected from the second solution outlet port to the first solution return pipe between the second heat exchanger and the third heat exchanger; a third branch point branched from the second solution supply pipe (22) and disposed between the third solution pump and the second regenerator and connected to the second solution branch pipe; a fourth branch point disposed on the second solution branch pipe between the third branch point and the third heat exchanger; and a third solution branch pipe of which one end of the third solution branch pipe is connected to the fourth branch point and the other end of the third solution branch pipe is connected to the second solution branch pipe between the outlet of the third heat exchanger and the third regenerator.

In an exemplary embodiment, the apparatus may be characterized in that: the flow rate of the first medium-concentrated solution flowing through the second solution return pipe from the second branch point to the first solution return pipe is 1% to 9% of the flow rate of the medium-concentrated solution discharged from the first solution outlet port, and the flow rate of the second medium solution flowing through the second solution supply pipe from the second branch point to the third branch point which is an end point is 91% to 99% of the flow rate of the medium-concentrated solution discharged from the first solution outlet port.

In an exemplary embodiment, the apparatus may be characterized in that: the flow rate of the third medium-concentrated solution flowing through the second solution supply pipe from the third branch point to the second solution inlet port is 40% to 50% of the flow rate of the second medium-concentrated solution, the flow rate of the fourth medium-concentrated solution flowing through the second solution branch pipe from the third branch point to the third solution inlet port is 45% to 55% of the flow rate of the second medium-concentrated solution, and the second medium-concentrated solution flows through the second solution supply pipe from the second branch point to the third branch point, which is the end point.

Exemplary embodiments of the present invention can provide a triple-effect absorption chilling apparatus comprising at least one evaporator; at least one absorber for absorbing refrigerant vapor generated from the evaporator to a dilute lithium bromide solution (hereinafter, referred to as 'weak solution'); a first regenerator connected in series with the absorber and comprising a first heat transfer tube therein, wherein the weak solution supplied from the absorber is heated by the condensation latent heat of the refrigerant vapor in the first heat transfer pipe, and concentrated to medium-concentrated solution which is a thicker concentrated solution than the weak solution; a bypass pipe configured to connect the inlet pipe connecting the absorber and the first regenerator and the outlet pipe discharging the medium-concentrated solution from the first regenerator; and a switching valve mounted on the bypass pipe and controlled so as to maintain or shut off the connection of the inlet pipe and the outlet pipe with each other.

In an exemplary embodiment, the apparatus may further comprise: a second regenerator connected in series with the first regenerator and comprising a second heat transfer tube therein, wherein the medium-concentrated solution supplied from the first regenerator is heated by the condensation latent heat of the refrigerant vapor in the second heat transfer pipe, and concentrated to strong solution which is a thicker concentrated solution than the medium-concentrated solution; and a third regenerator connected in series with the first regenerator and connected in parallel with the second regenerator and comprising a heat source therein wherein the medium-concentrated solution supplied from the first regenerator is heated by the heat source, and concentrated to strong solution which is a thicker concentrated solution than the medium-concentrated solution, wherein the internal temperature of the third regenerator is higher than the internal temperature of the second regenerator, and the internal temperature of the second regenerator is higher than the internal temperature of the first regenerator, the switching valve keeps ON state until the third regenerator reaches a predetermined temperature and pressure to block the weak solution from flowing into the first regenerator, and when the internal temperature of the third regenerator reaches 120 to 140° C. and the internal pressure of the third regenerator reaches 400 to 700 mmHg, the switching valve is turned OFF to block the flow path of the bypass pipe.

According to the present invention, by adopting a structure of an anti-parallel cycle in which an absorber and a first regenerator are connected in series, mutually connected second regenerator and third regenerator are connected in series with the first regenerator, and the solution through the second regenerator and the third regenerator is returned to the absorber, it is possible to obtain a high coefficient of performance as compared with the conventional absorption chiller and to use gas resources such as heat of combustion, steam, or arrangement of city gas as a heat source necessary for operation of the entire apparatus and to provide environmentally friendly devices that can help reduce carbon emissions.

First, the present invention is characterized in that it is possible to prevent the sensible heat loss of the first regenerator in the initial operation or the minimum load operation by comprising the constitution in which the switching valve is mounted on the bypass pipe connecting the inlet pipe and the outlet pipe of the first regenerator, and it is possible to improve the efficiency of the entire apparatus as well as improve the load response speed.

Particularly, the present invention enables switching operation by switching the entire apparatus to a double-effect absorption chiller and a triple-effect absorption chiller by on/off control of a switching valve, so that it can actively cope with demands of various consumers.

Further, according to the present invention, since the absorber and the first regenerator are connected in series, and the parallel connection of the second regenerator and the third regenerator is connected in series with the first regenerator to form an antiparallel cycle, it is possible to obtain a high coefficient of performance as compared with the conventional absorption chiller.

In addition, since the present invention can alternatively use gas resources such as heat of combustion and steam or arrangement of the city gas as a heat source necessary for operating the entire apparatus, and thus it is possible to help reduce carbon emission.

DETAILED DESCRIPTION OF THE INVENTION

Advantages and features of the present invention and methods for accomplishing the same will be apparent from the following detailed embodiments with the accompanying drawings.

However, the present invention is not limited to the embodiments described below, but may be implemented in various other forms.

In the present specification, the present embodiments are provided so that the disclosure of the present invention is complete and that those skilled in the an will fully understand the scope of the present invention.

And the present invention is only defined by the scope of the claims

Thus, in some embodiments, well known components, well known operations, and well-known techniques are not specifically described to avoid an ambiguous interpretation of the present invention.

In addition, throughout the specification, the same reference symbol refers to the same component, and terms used (referred to) herein are intended to illustrate the embodiments and not to limit the present invention.

In this specification, the singular forms include plural forms unless the context clearly dictates otherwise, and components and acts referred to as 'comprising (or having)' shall not exclude the presence or addition of one or more other components and actions.

Unless defined otherwise, all terms (including technical and scientific terms) used in this specification can be used as a commonly understandable meaning to those skilled in the art to which this invention belongs.

Also, commonly used predefined terms are not ideally or excessively interpreted unless defined.

Hereinafter, preferred embodiments of the present invention will be described with reference to the accompanying drawings.

Figure 1:
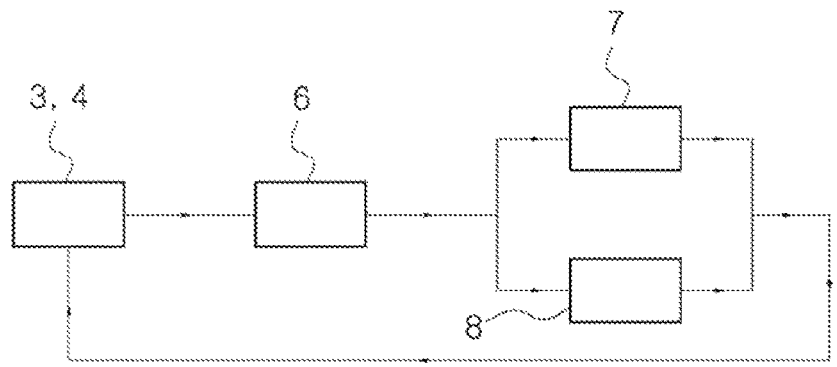
FIG. 1 is a block diagram schematically showing a solution flow cycle of a triple-effect absorption chilling apparatus according to an embodiment of the present invention.
Figure 2:
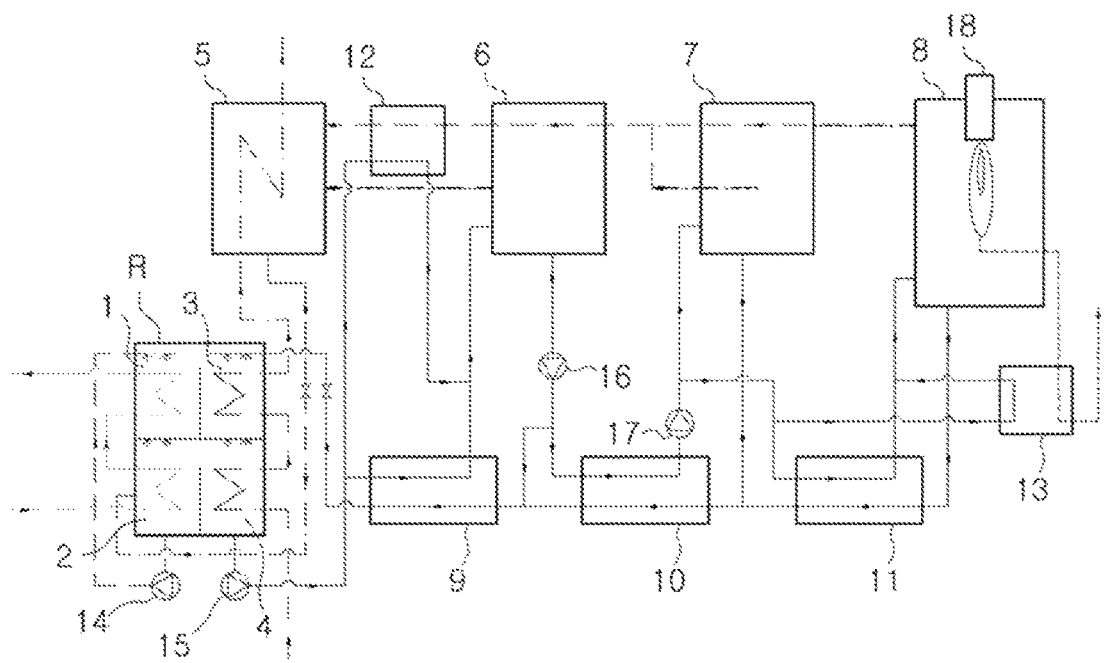
FIG. 2 and FIG. 3 are conceptual diagrams showing the overall structure of a triple-effect absorption chilling apparatus according to the embodiment of FIG. 1.
Figure 3:
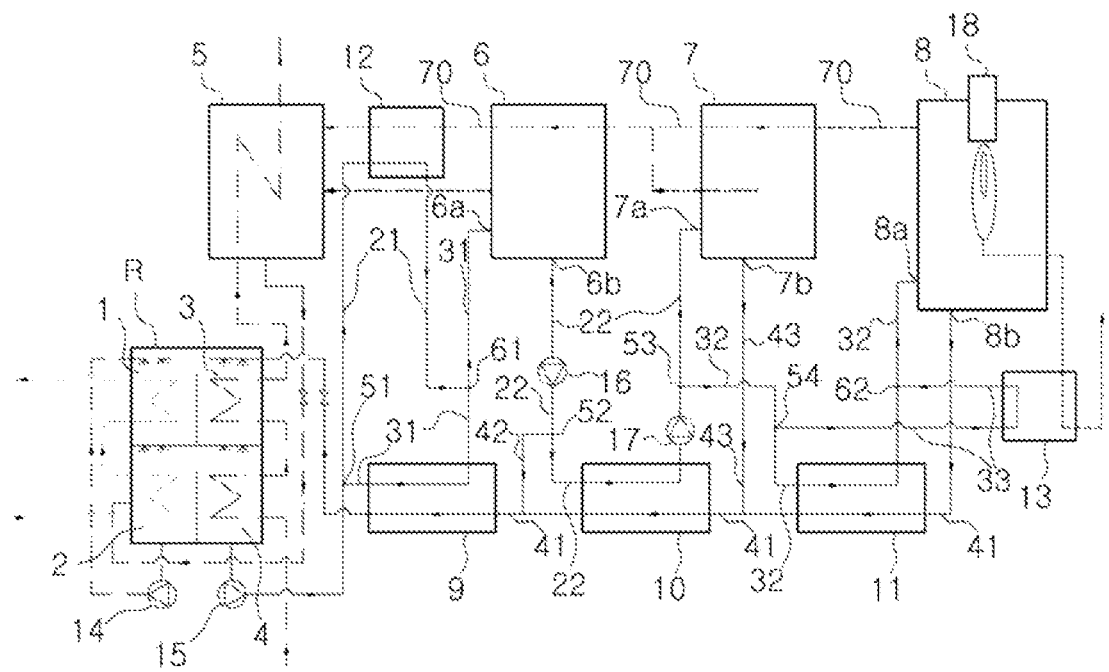

FIG. 1 is a block diagram schematically showing a solution flow cycle of a triple-effect absorption chiller according to an embodiment of the present invention, and FIG. 2 and FIG. 3 are conceptual diagrams showing the overall configuration of a triple-effect absorption chiller according to the embodiment of FIG. 1.

According to FIG. 2 and FIG. 3, the one-direction-flowing fluid expressed by solid line indicates solution, which are weak solution, medium-concentrated solution, strong solution. The one-direction-flowing fluid expressed by one-dot chain line indicates refrigerant. The one-direction-flowing fluid expressed by one dot chain line and dotted line near each other indicates refrigerant vapor. The one-direction-flowing fluid expressed by two-dot chain line indicates cooling water. The one-direction-flowing fluid expressed by dotted line on the left side of FIG. 2 and FIG. 3 indicates chilled water.

As shown in the drawing, it is to be understood that the present invention comprises a structure of an anti-parallel cycle. In the anti-parallel cycle, the absorber and the first regenerator 6 are connected in series, and the second regenerator 7 and the third regenerator 8 are connected in parallel with each other, and the parallel connection of the second regenerator 7 and the third regenerator 8 is connected to the first regenerator 6 in series, and the solution through the second regenerator 7 and the third regenerator 8 is returned to the absorber.

At first, the absorption chiller R includes at least one evaporator 1, 2 and at least one absorber 3, 4, which absorbs the refrigerant vapor generated by the evaporator 1, 2 with diluted lithium bromide solution (hereinafter referred to as 'weak solution').

First, the cold water flowing into the absorption chiller R passes through the heat transfer tube in the lower evaporator 2, and is cooled while being deprived of heat by the evaporation latent heat of the refrigerant. Then, the cold water, passes through the heat transfer tube in the upper evaporator 1, is cooled again while being deprived of heat by the evaporation latent heat of the refrigerant to produce chilled water.

The refrigerant vapor generated in the upper evaporator 1 flows into the upper absorber 3 and is absorbed by the dilute solution of the intermediate concentration. The dilute solution of the intermediate concentration is supplied to the lower absorber 4 by gravity to absorb the refrigerant vapor generated in the lower evaporator 2.

At this time, the generated absorption heat is removed by the cooling water flowing in the heat transfer tube of the absorber, and the pressure of the absorber 3, 4 and the evaporator 1, 2 are kept constant at 5~7 mmHg so that the refrigerant evaporation action of the evaporator 1, 2 is continuously performed.

And, the first regenerator 6 is connected in series with the absorber 3, 4 and has a first heat transfer pipe (not shown) therein. The weak solution supplied from the absorber 3, 4 is heated by the condensation latent heat of the refrigerant vapor in the first heat transfer pipe, and concentrated to medium-concentrated solution which is a thicker concentrated solution than the weak solution.

The second regenerator 7 is connected in series with the first regenerator 6 and has a second heat transfer pipe (not shown) therein. The medium concentrated solution supplied from the first regenerator 6 is heated by the condensation latent heat of the refrigerant vapor in the second heat transfer pipe, and concentrated to strong solution which is a thicker concentrated solution than the medium concentrated solution.

Also, the third regenerator 8 is connected in series with the first regenerator 6 and connected in parallel with the second regenerator 7 described above. And the third regenerator 8 has a heat source 18 therein. The medium concentrated solution supplied from the first regenerator 6 is heated by the heat source 18 and concentrated to strong solution which is a thicker concentrated solution than the medium concentrated solution.

Since various sources of combustion heat such as gas, waste heat of the plant, or steam, etc. are directly burned by the heat source 18, the internal temperature of the third regenerator 8 is higher than the internal temperature of the second regenerator 7 and the internal temperature of the second regenerator 7 is higher than the internal temperature of the first regenerator 6.

Therefore, the present invention can obtain a high coefficient of performance as compared with the conventional absorption refrigerator, and can use gas resources such as combustion heat, steam, or arrangement of city gas as a heat source necessary for operation of the entire apparatus. It will be able to help decrease amount of carbon emission.

The present invention is applicable to the above implementation, and is also applicable to the following various embodiments.

First, for the implementation of the anti-parallel cycle as described above, the present invention can further comprise a refrigerant vapor emission pipe 70 and a condenser 5. The refrigerant vapor emission pipe 70 forms a flow path emitting the refrigerant vapor heated from the third regenerator 8. The refrigerant vapor emission pipe 70 sequentially passes through the second regenerator 7 and the first regenerator 6 from the third regenerator 8. The condenser 5 is connected to the end of the refrigerant vapor emission pipe 70 and condenses the refrigerant vapor and discharge the condensed refrigerant vapor through the refrigerant condensation pipe to the evaporator 1, 2.

For smooth transfer of the refrigerant and the solution, the absorption chiller R may include a refrigerant pump 14 for supplying the refrigerant to the evaporators 1, 2 and a first solution pump 15 for supplying the weak solution to the first regenerator 6 from the absorber 3, 4.

At this time, for complete implementation of an anti-parallel cycle, together with the above-described first solution pump 15, the present invention can further comprise a first solution supply pipe 21 forming a flow path supplying the weak solution to the first regenerator 6. Here, the first solution supply pipe 21 is connected to the outlet of the first solution pump 15.

The present invention can further comprise a first solution branch pipe 31, which is branched from the first solution supply pipe 21 and connected to the first solution inlet port 6a of the first regenerator 6.

The present invention can further comprise a second solution supply pipe 22, which is connected to a second solution inlet port 7a of the second regenerator 7 from the first solution outlet port 6b of the first regenerator 6.

The present invention may further include a second solution branch pipe 32, which is branched from the second solution supply pipe 22 and connected to the third solution inlet port 8a of the third regenerator 8.

Also, the present invention may further comprise a first solution return pipe 41, which is connected from the third solution outlet port 8b of the third regenerator 8 to the absorber 3, 4.

It can be understood that the end of the first solution supply pipe 21 is connected to the first solution branch pipe 31, and joined together.

Further, the present invention may further comprise a first branch point 51, at which the start end of the first solution branch pipe 31 is branched from the first solution supply pipe 21.

The present invention may further comprise a first junction point 61, to which the end of the first solution supply pipe 21 and the first solution branch pipe 31 are connected.

The present invention may further comprise a first heat exchanger 9. The first heat exchanger 9 is arranged on the first solution branch pipe 31 between the first branch point 51 and the first junction point 61. The first solution return pipe 41 passes through the first heat exchanger 9. The weak solution flowing in the first solution branch pipe 31 and the solution discharged from the third regenerator 8 mutually heat-exchange in the first heat exchanger 9.

The present invention may further comprise a second heat exchanger 10. The second heat exchanger 10 is arranged on the second solution supply pipe 22. The first solution return pipe 41 passes through the second heat exchanger 10. The medium concentrated solution flowing in the second solution supply pipe 22 and the solution discharged from the third regenerator 8 mutually heat-exchange in the second heat exchanger 10.

The present invention may further comprise a third heat exchanger 11. The third heat exchanger 11 is arranged on the second solution branch pipe 32. The first solution return pipe 41 passes through the third heat exchanger 11. The medium concentrated solution flowing in the second solution branch pipe 32 and the solution discharged from the third regenerator 8 mutually heat-exchange in the third heat exchanger 11.

The internal temperature of the third heat exchanger 11 is higher than the internal temperature of the second heat exchanger 10. The internal temperature of the second heat exchanger 10 is higher than the internal temperature of the first heat exchanger 9.

At this time, the third heat exchanger 11, the second heat exchanger 10, and the first heat exchanger 9 are arranged in sequence on the first solution return pipe 41 from the third regenerator 8 to the absorber 3, 4.

Also, the present invention may further comprise a condensation refrigerant heat exchanger 12. The condensation refrigerant heat exchanger 12 is mounted on the refrigerant vapor discharge pipe 70 and disposed between the condenser 5 and the first regenerator 6. The first solution supply pipe 21 passes through the condensation refrigerant heat exchanger 12. The fluid flowing in the refrigerant vapor discharge pipe 70 and the fluid flowing in the first solution supply pipe 21 mutually heat-exchange in the condensation refrigerant heat exchanger 12.

The condensation refrigerant heat exchanger 12 is intended to reduce the operation load of the condenser 5 and further increase the condensing efficiency of the refrigerant.

Meanwhile, the present invention may further comprise a second solution pump 16 mounted on the second solution supply pipe 22 between the first regenerator 6 and the second heat exchanger 10. The second solution pump 16 transfers the weak solution from the first solution outlet port 6b to the second heat exchanger 10.

The present invention may further comprise a third solution pump 17, which is mounted on the second solution supply pipe 22 between the second heat exchanger 10 and the second regenerator 7. The third solution pump 17 transfers the medium concentrated solution from the outlet of the second heat exchanger 10 to the second regenerator 7.

The present invention may further comprise a second branch point 52 branched from the second solution supply pipe 22 and disposed between the second solution pump 16 and the inlet of the second heat exchanger 10.

The present invention may further comprise a second solution return pipe 42, which forms a flow path for transferring a part of the medium concentrated solution discharged from the second solution supply pipe 22 to the absorber 3, 4 via the first heat exchanger 9. One end of the second solution return pipe 42 is connected to the second branch point 52. The other end of the second solution return pipe 42 is connected to the first solution return pipe 41 between the first heat exchanger 9 and the second heat exchanger 10.

The present invention may further comprise a third solution return pipe 43, which forms a flow path for transferring a part of the strong solution discharged from the second regenerator 7 to the absorber 3, 4 sequentially through the second heat exchanger 10 and the first heat exchanger 9. The third solution return pipe 43 is connected from the second solution outlet port 7b to the first solution return pipe 41 between the second heat exchanger 10 and the third heat exchanger 11.

The present invention may further comprise a third branch point 53 branched from the second solution supply pipe 22 and disposed between the third solution pump 17 and the second regenerator 7. The third branch point 53 is connected to the second solution branch pipe 32.

The present invention may further comprise a fourth branch point 54 disposed on the second solution branch pipe 32 between the third branch point 53 and the third heat exchanger 11.

Also, the present invention may further comprise a third solution branch pipe 33. One end of the third solution branch pipe 33 is connected to the fourth branch point 54. The other end of the third solution branch pipe 33 is connected to the second solution branch pipe 32 between the outlet side of the third heat exchanger 11 and the third regenerator 8.

At this time, the other end of the third solution branch pipe 33 is connected to the second solution branch pipe 32 by the second junction point 62.

Meanwhile, the present invention may further comprise an exhaust gas heat exchanger 13 mounted on the thud solution branch pipe 33 and performing heat-exchange with the combustion gas discharged from the third regenerator 8.

The exhaust gas heat exchanger 13 recycles the waste heat of the combustion gas discharged from the third regenerator 8 to reduce the load of the running and operation of the third regenerator 8. At the same time, it is possible to reduce the unnecessary waste of the heat source which should be burned by using the heat source 18 such a gas.

The flow of the solution and refrigerant of the triple-effect absorption chilling apparatus according to various embodiments of the present invention as described above will be described as follows.

First, a portion of the diluted lithium bromide aqueous solution (hereinafter referred to as 'weak solution') absorbing the refrigerant vapor in the absorber 3, 4 is introduced into the condensation refrigerant heat exchanger 12 by the first solution pump 15. And the remainder is supplied to the first heat exchanger 9 and heated, and then introduced into the first regenerator 6.

The weak solution supplied to the first regenerator 6 is heated by the condensation latent heat of the refrigerant vapor in the heat pipe of the first regenerator to generate the refrigerant vapor, and is concentrated into a concentrated solution of a medium concentration (hereinafter referred to as 'medium-concentrated solution').

Thereafter, by the second solution pump 16, a small amount of the medium-concentrated solution merges with the solution concentrated in the second regenerator 7 and the third regenerator, and is supplied to the first heat exchanger 9. The rest of solution is distributed and supplied to the second regenerator 7 and the third regenerator 8 in parallel.

At this time, a part of the medium-concentrated solution distributed to the third regenerator 8 is supplied to the exhaust gas heat exchanger 13 to be heated. The rest pan of the solution is supplied to the third heat exchanger 11 to be heated and then merges with the medium-concentrated solution supplied to the exhaust gas heat exchanger 13, and flows into the third regenerator 8.

The medium-concentrated solution supplied to the third regenerator 8 is heated by the heat source 18 to generate a refrigerant vapor, and is concentrated into the strong solution.

The high-temperature refrigerant vapor generated flows into the heat transfer pipe of the second regenerator 7.

On the other hand, the medium-concentrated solution flowing into the second regenerator 7 is heated by the condensation latent heat of the high-temperature refrigerant vapor in the heat transfer pipe of the second regenerator 7 to generate the refrigerant vapor, and is concentrated into the strong solution.

At this time, the generated refrigerant vapor and the high-temperature refrigerant condensed in the heat transfer pipe of the second regenerator 7 are combined and fed into the heat transfer pipe of the first regenerator 6 to concentrate the weak solution supplying to the first regenerator 6 described above.

Hereafter, the generated refrigerant vapor and the high-temperature refrigerant condensed in the heat transfer pipe of the second regenerator 7 are again cooled passing through the condensation refrigerant heat exchanger 12, and flow into the condenser 5.

Meanwhile, the refrigerant vapor generated in the first regenerator 6 and the refrigerant generated in the third regenerator 8 and the second regenerator 7 are condensed by the cooling water (see the two-dotted chain line) flowing in the heat transfer pipe of the condenser 5.

The condensed refrigerant liquid flows into the evaporator 1, 2 by the gravity and pressure difference to produce cold water required for cooling (see the line indicated by an increasing dot on the left side of the drawing).

The strong solution concentrated in the third regenerator 8 is combined with the strong solution concentrated in the second regenerator 7 via the third heat exchanger 11 and supplied to the second heat exchanger 10 to be cooled, and is combined with a small amount of the medium-concentrated solution concentrated in the first regenerator 6 and supplied to the first heat exchanger 9 to be cooled and then supplied to the upper absorber 3 to maintain the triple-effect absorption cycle.

In short, in the present invention, the solution is first supplied to the first regenerator 6 from the absorber 3, 4 and concentrated, and the concentrated medium-concentrated solution is supplied to the second regenerator 7 and the third regenerator 8 simultaneously thereby constituting an anti-parallel flow cycle.

According to the prior art, a pump should be added to the out let of the second regenerator in view of the solution flow characteristics of the conventional reverse-flow type triple-effect absorption cycle, and there was a need for a complicated structure that constitutes a pipe for branching a part of the solution from the outlet of the first regenerator and the second regenerator to the strong solution recirculating to the absorber. In particular, since the solution flows in the present invention are configured in anti-parallel on a cycle, it is possible to overcome the problems of the prior art described above.

Hereinafter, it will be described controlling the flow rate of the solution of the triple-effect absorption chiller according to one embodiment of the present invention in order to improve the coefficient of performance (hereinafter, 'COP').

First, the flow rate of the first weak solution flowing through the first solution supply pipe 21 from the first branch point 51 to the first junction point 61, which is the end point, is set to be 10% to 20% of the flow rate of the weak solution discharged from the absorber 3, 4.

And, the flow rate of the second weak solution flowing through the first solution branch pipe 31 from the first branch point 51 to the first solution inlet port 6a, which is the end point, is set to be 80% to 90% of the flow rate of the weak solution discharged from the absorber 3, 4.

The flow rate of the first weak solution is preferably about 15% of the flow rate of the weak solution discharged from the absorber 3, 4. The flow rate of the second weak solution is preferably about 85% of the flow rate of the weak solution discharged from the absorber 3, 4.

And, the flow rate of the first medium-concentrated solution flowing through the second solution return pipe 42 from the second branch point 52 to the first solution return pipe 41 is set to be 1% to 9% of the flow rate of the medium-concentrated solution discharged from the first solution outlet port 6b.

The flow rate of the second medium solution flowing through the second solution supply pipe 22 from the second branch point 52 to the third branch point 53 is set to be 91% to 99% of the flow rate of the medium-concentrated solution discharged from the first solution outlet port 6b.

The flow rate of the first medium-concentrated solution is set to be about 5% of the flow rate of the medium-concentrated solution discharged from the first solution outlet port 6b. The flow rate of the second medium concentrated solution is set to be about 95% of the flow rate of the medium-concentrated solution discharged from the first solution outlet port 6b.

The flow rate of the third medium-concentrated solution flowing through the second solution supply pipe 22 from the third branch point 53 to the second solution inlet port 7a is set to be 40% to 50% of the flow rate of the second medium-concentrated solution.

Also, the flow rate of the fourth medium-concentrated solution flowing through the second solution branch pipe 32 from the third branch point 53 to the third solution inlet port 8a is set to be 45% to 55% of the flow rate of the second medium-concentrated solution.

The flow rate of the third medium-concentrated solution is set to be about 45% of the flow rate of the second medium-concentrated solution, and the flow rate of the fourth medium-concentrated solution is set to be about 50% of the flow rate of the second medium-concentrated solution.

Accordingly, with the control of the flow rate of the solution as described above, the cooling capacity of the triple-effect absorption chiller according to an embodiment of the present invention is 105.6 RT, and the COP is 1.744, which is improved than that of the conventional absorption chiller.

At this time, the flow rate of the combustion gas supplied to the third regenerator 8 is 0.003905 kg per second, and the internal temperature of the third regenerator 8 is 195.8° C., and the discharge temperature of the combustion gas discharged through the third regenerator 8 is 168.9° C., and the inlet temperature of the cold water flowing through the heat transfer pipe of the evaporator 1,2 is 12° C., and the flow rate of the cold water is 16.8 kg per second, and the inlet temperature of the cooling water flowing through the heat transfer pipes of the absorber 3,4 and the condenser 5 is 32° C., and the flow rate of the cooling water is 27.8 kg per second.

As described above, the present invention can provide triple-effect absorption chiller capable of energy saving and improving the efficiency through acquisition of a higher COP than the conventional absorption chiller.

It should be understood that many other modifications and applications are possible within the scope of the basic technical idea of the present invention. For example, although not specifically shown, solenoid three-way valves may be attached to the first to fourth branch points 51, 52, 53, 54, and the flow rate control as described above can be performed by operating the control panel.

Figure 4:
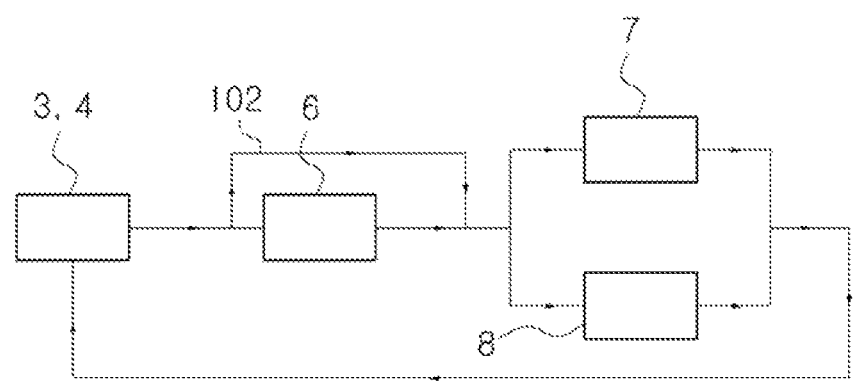
FIG. 4 is a block diagram schematically showing a solution flow cycle of a triple-effect absorption chilling apparatus according to an embodiment of the present invention.
Figure 5:
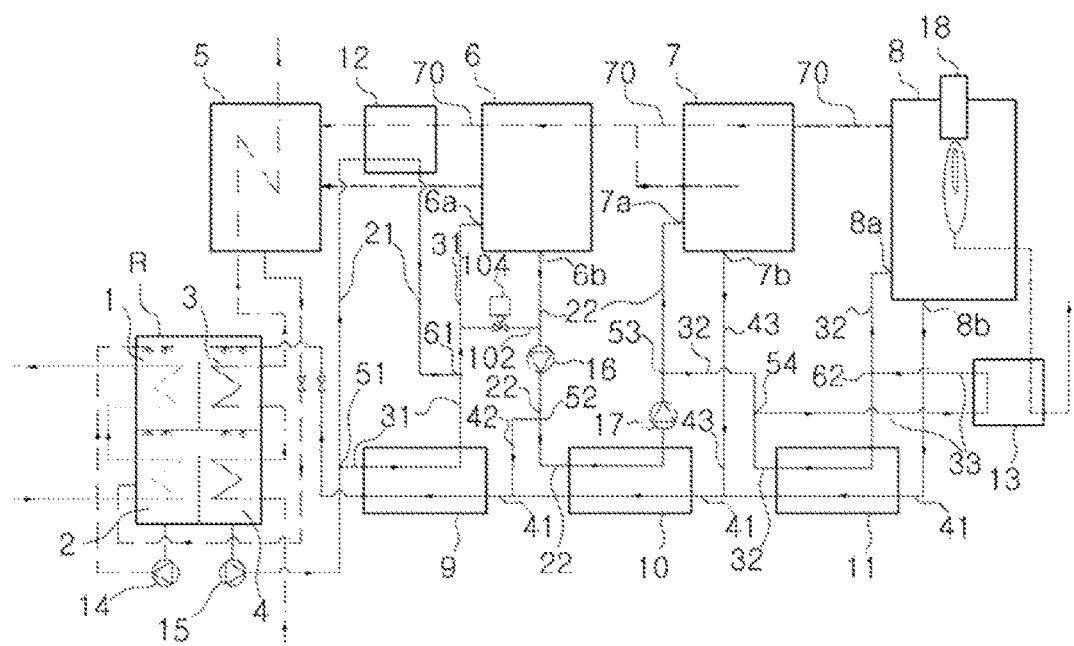
FIG. 5 is a conceptual diagram showing the overall configuration of a triple-effect absorption chilling apparatus according to the embodiment of FIG. 4.

FIG. 4 is a block diagram schematically showing a solution flow cycle of a triple-effect absorption chilling apparatus according to an embodiment of the present invention. FIG. 5 is a conceptual diagram showing the overall configuration of a triple-effect absorption chilling apparatus according to the embodiment of FIG. 4.

For reference, in FIG. 5, the one-direction-flowing fluid expressed by solid line indicates solution, which are weak solution, medium-concentrated solution, strong solution. The one-direction-flowing fluid expressed by one-dot chain line indicates refrigerant. The one-direction-flowing fluid expressed by one-dot chain line and dotted line near each other indicates refrigerant vapor. The one-direction-flowing fluid expressed by two-dot chain line indicates cooling water. The one-direction-flowing fluid expressed by dotted line on the left side of FIG. 2 indicates chilled water.

As shown in the drawing, the present invention comprises the constitution in which the switching valve 104 is mounted on the bypass pipe 102 connecting the inlet pipe 31 (see the first solution branch pipe 31 to be described later) and the outlet pipe 22 (see the second solution supply pipe 22 to be described later) of the first regenerator 6.

At first, the absorption chiller R includes at least one evaporator 1, 2 and at least one absorber 3, 4 for absorbing the refrigerant vapor generated from the evaporator 1, 2 with a dilute lithium bromide solution (hereinafter referred to as 'weak solution').

First, the cold water flowing into the absorption chiller R passes through the heat transfer tube in the lower evaporator 2, is cooled while being deprived of heat by the evaporation latent heat of the refrigerant. Then, the cold water passes through the heat transfer tube in the upper evaporator 1, is cooled again while being deprived of heat by the evaporation latent heat of the refrigerant to produce chilled water.

Here, the refrigerant vapor generated in the upper evaporator 1 flows into the upper absorber 3 and is absorbed by the dilute solution of the intermediate concentration. The dilute solution of the intermediate concentration is supplied to the lower absorber 4 by gravity to absorb the refrigerant vapor generated in the lower evaporator 2.

At this time, the generated absorption heat is removed by the cooling water flowing in the heat transfer tube of the absorber, and the pressure of the absorber 3, 4 and the evaporator 1, 2 are kept constant at 5~7 mmHg so that the refrigerant evaporation action of the evaporator 1, 2 is continuously performed.

And, the first regenerator 6 is connected in series with the absorber 3,4 and has a first heat transfer pipe (not shown) therein. The weak solution supplied from the absorber 3, 4 is heated by the condensation latent heat of the refrigerant vapor in the first heat transfer pipe, and concentrated to medium-concentrated solution which is a thicker concentrated solution than the weak solution.

The bypass pipe 102 forms a flow path for interconnecting the inlet pipe 31 connecting the absorber 3, 4 and the first regenerator 6 and the outlet pipe 22 discharging the medium-concentrated solution from the first regenerator 6.

The switching valve 104 is mounted on the bypass pipe 102 and is controlled so as to maintain or shut off the connection of the inlet pipe 31 and the outlet pipe 22 with each other.

Therefore, the present invention can prevent the sensible heat loss of the first regenerator 6 in the initial operation or the minimum load operation, thereby improving the speed of load response and increasing the efficiency of the entire apparatus.

In particular, the present invention enables switching operation by switching the entire apparatus to a double-effect absorption chiller and a triple-effect absorption chiller by on/off control of a switching valve, so that it can actively cope with demands of various consumers.

It is to be understood that the present invention may be embodied in many other specific forms without departing from the spirit or scope of the invention.

First, the present invention may fluffier comprise a second regenerator 7. The second regenerator 7 is connected in series with the first regenerator 6 and has a second heat transfer pipe (not shown) therein. The medium-concentrated solution supplied from the first regenerator 6 is heated by the condensation latent heat of the refrigerant vapor in the second heat transfer pipe, and concentrated to strong solution which is a thicker concentrated solution than the medium-concentrated solution.

And, the present invention may further comprise a third regenerator 8. The third regenerator 8 is connected in series with the first regenerator 6 and connected in parallel with the second regenerator 7 described above. And the third regenerator 8 has a heat source 18 therein. The medium-concentrated solution supplied from the first regenerator 6 is heated by the heat source 18 and concentrated to strong solution which is a thicker concentrated solution than the medium-concentrated solution.

Here, since various sources of combustion heat such as gas, waste heat of the plant, or steam, etc. are directly burned by the heat source 18, the internal temperature of the third regenerator 8 is higher than the internal temperature of the second regenerator 7 and the internal temperature of the second regenerator 7 is higher than the internal temperature of the first regenerator 6.

At this time, the switching valve 104 keeps ON state, that is open state, until the third regenerator reaches to the constant temperature and the constant pressure to keep the weak solution from flowing to the first regenerator 6, so that the sensible heat loss of the first regenerator 6 can be prevented.

In addition, the present invention prevents the sensible heat loss of the first regenerator 6 by the bypass pipe 102 and the switching valve 104, and at the same time, the present invention comprises the constitution which the absorber and the first regenerator are connected in series, and the parallel connection of the second regenerator and the third regenerator is connected in series with the first regenerator to form an antiparallel cycle constitution returning the solution passed through the second regenerator 7 and the third regenerator 8 to the absorber.

Accordingly, the present invention has a structure of antiparallel cycle as well as prevention of sensible heat loss, so that a high coefficient of performance is obtained as compared with the conventional absorption chiller, and the heat of combustion and the steam or arrangement of the city gas can be used as a substitute as a heat source for the operation of the whole apparatus, which will help reduce carbon emissions.

Meanwhile, for the implementation of the anti-parallel cycle as described above, the present invention can further comprise a refrigerant vapor emission pipe 70 and a condenser 5. The refrigerant vapor emission pipe 70 forms a flow path emitting the refrigerant vapor heated from the third regenerator 8. The refrigerant vapor emission pipe 70 sequentially passes through the second regenerator 7 and the first regenerator 6 from the third regenerator 8. The condenser 5 is connected to the end of the refrigerant vapor emission pipe 70 and condenses the refrigerant vapor and discharge the condensed refrigerant vapor through the refrigerant condensation pipe to the evaporator 1,2.

Here, for smooth transfer of the refrigerant and the solution, the absorption chiller R may include a refrigerant pump 14 for supplying the refrigerant to the evaporators 1, 2 and a first solution pump 15 for supplying the weak solution to the first regenerator 6 from the absorber 3, 4.

At this time, for complete implementation of an antiparallel cycle, together with the above-described first solution pump 15, the present invention can further comprise a first solution supply pipe 21 forming a flow path supplying the weak solution to the first regenerator 6. Here, the first solution supply pipe 21 is connected to the outlet of the first solution pump 15.

And, the present invention can further comprise a first solution branch pipe 31 branched from the first solution supply pipe 21 and connected to the first solution inlet port 6a of the first regenerator 6.

And, the present invention can further comprise a second solution supply pipe 22 connected to a second solution inlet port 7a of the second regenerator 7 from the first solution outlet port 6b of the first regenerator 6. Here, the second solution supply pipe 22 is an outlet pipe of the first regenerator 6.

And, the present invention may further include a second solution branch pipe 32 branched from the second solution supply pipe 22 and connected to the third solution inlet port 8a of the third regenerator 8.

Also, the present invention may further comprise a first solution return pipe 41 connected from the third solution outlet port 8b of the third regenerator 8 to the absorber 3, 4.

Here, it can be understood that the end of the first solution supply pipe 21 is connected to the first solution branch pipe 31 and joined together.

Further, the present invention may further comprise a first branch point 51 where the start end of the first solution branch pipe 31 is branched from the first solution supply pipe 21.

And, the present invention may further comprise a first junction point 61 to which the end of the first solution supply pipe 21 and the first solution branch pipe 31 are connected.

And, the present invention may further comprise a first heat exchanger 9. The first heat exchanger 9 is arranged on the first solution branch pipe 31 between the first branch point 51 and the first junction point 61. The first solution return pipe 41 passes through the first heat exchanger 9. The weak solution flowing in the first solution branch pipe 31 and the solution discharged from the third regenerator 8 mutually heat-exchange in the first heat exchanger 9.

And, the present invention may further comprise a second heat exchanger 10. The second heat exchanger 10 is arranged on the second solution supply pipe 22. The first solution return pipe 41 passes through, the second heat exchanger 10. The medium-concentrated solution flowing in the second solution supply pipe 22 and the solution discharged from the third regenerator 8 mutually heat-exchange in the second heat exchanger 10.

And, the present invention may further comprise a third heat exchanger 11. The third heat exchanger 11 is arranged on the second solution branch pipe 32. The first solution return pipe 41 passes through the third heat exchanger 11. The medium-concentrated solution flowing in the second solution branch pipe 32 and the solution discharged from the third regenerator 8 mutually heat-exchange in the third heat exchanger 11.

Here, the internal temperature of the third heat exchanger 11 is higher than the internal temperature of the second heat exchanger 10 and the internal temperature of the second heat exchanger 10 is higher than the internal temperature of the first heat exchanger 9.

At this time, the third heat exchanger 11, the second heat exchanger 10, and the first heat exchanger 9 are arranged in sequence on the first solution return pipe 41 from the third regenerator 8 to the absorber 3, 4.

Also, the present invention may further comprise a condensation refrigerant heat exchanger 12. The condensation refrigerant heat exchanger 12 is mounted on the refrigerant vapor discharge pipe 70 and disposed between the condenser 5 and the first regenerator 6. The first solution supply pipe 21 passes through the condensation refrigerant heat exchanger 12. The fluid flowing in the refrigerant vapor discharge pipe 70 and the fluid flowing in the first solution supply pipe 21 mutually heat-exchange in the condensation refrigerant heat exchanger 12.

The condensation refrigerant heat exchanger 12 is intended to reduce the operation load of the condenser 5 and further increase the condensing efficiency of the refrigerant.

Meanwhile, the present invention may further comprise a second solution pump 16 mounted, on the second solution supply pipe 22 between the first regenerator 6 and the second heat exchanger 10. The second solution pump 16 transfers the weak solution from the first solution outlet port 6b to the second heat exchanger 10.

And, the present invention may further comprise a third solution pump 17 mounted on the second solution supply pipe 22 between the second heat exchanger 10 and the second regenerator 7. The third solution pump 17 transfers the medium concentrated solution from the out let of the second heat exchanger 10 to the second regenerator 7.

And, the present invention may further comprise a second branch point 52 branched from the second solution supply pipe 22 and disposed between the second solution pump 16 and the inlet of the second heat exchanger 10.

And, the present invention may further comprise a second solution return pipe 42 which forms a flow path for transferring a part of the medium concentrated solution discharged from the second solution supply pipe 22 to the absorber 3, 4 via the first heat exchanger 9. One end of the second solution return pipe 42 is connected to the second branch point 52 and the other end of the second solution return pipe 42 is connected to the first solution return pipe 41 between the first heat exchanger 9 and the second heat exchanger 10.

And, the present invention may further comprise a third solution return pipe 43 which forms a flow path for transferring a part of the strong solution discharged from the second regenerator 7 to the absorber 3, 4 sequentially through the second heat exchanger 10 and the first heat exchanger 9. The third solution return pipe 43 is connected from the second solution outlet port 7b to the first solution return pipe 41 between the second heat exchanger 10 and the third heat exchanger 11.

And, the present invention may further comprise a third branch point 53 branched from the second solution supply pipe 22 and disposed between the third solution pump 17 and the second regenerator 7. The third branch point 53 is connected to the second solution branch pipe 32.

And, the present invention may further comprise a fourth branch point 54 disposed on the second solution branch pipe 32 between the third branch point 53 and the third heat exchanger 11.

Also, the present invention may further comprise a third solution branch pipe 33. One end of the third solution branch pipe 33 is connected to the fourth branch point 54 and the other end of the third solution branch pipe 33 is connected to the second solution branch pipe 32 between the outlet side of the third heat exchanger 11 and the third regenerator 8.

At this time, the other end of the third solution branch pipe 33 is connected to the second solution branch pipe 32 by the second junction point 62.

Meanwhile, the present invention may further comprise an exhaust gas heat exchanger 13 mounted on the third solution branch pipe 33 and performing heat-exchange with the combustion gas discharged from, the third regenerator 8.

The exhaust gas heat exchanger 13 recycles the waste heat of the combustion gas discharged from the third regenerator 8 to reduce the load of the running and operation of the third regenerator 8. At the same time, it is possible to reduce the unnecessary waste of the heat source which should be burned by using the heat source 18 such as city gas.

The flow of the solution and refrigerant of the triple-effect absorption chilling apparatus according to various embodiments of the present invention as described above will be described as follows.

First, a portion of the diluted lithium bromide aqueous solution (hereinafter referred to as 'weak solution' absorbing the refrigerant vapor in the absorber 3, 4 is introduced into the condensation refrigerant heat exchanger 12 by the first solution pump 15. And the remainder is supplied to the first heat exchanger 9 and heated, and then introduced into the first regenerator 6.

The weak solution supplied to the first regenerator 6 is heated by the condensation latent heat of the refrigerant vapor in the heat pipe of the first regenerator to generate the refrigerant vapor, and is concentrated into a concentrated solution of medium concentration (hereinafter referred to as "medium-concentrated solution").

Thereafter, by the second solution pump 16, a small amount of the medium-concentrated solution merges with the solution concentrated in the second regenerator 7 and the third regenerator, and is supplied to the first heat exchanger 9 and the remainder solution is distributed and supplied to the second regenerator 7 and the third regenerator 8 in parallel.

At this time, a part of the medium-concentrated solution distributed to the third regenerator 8 is supplied to the exhaust gas heat exchanger 13 to be heated and the remainder is supplied to the third heat exchanger 11 to be heated and then merges with the medium-concentrated solution supplied to the exhaust gas heat exchanger 13, and flows into the third regenerator 8.

The medium-concentrated solution supplied to the third regenerator 8 is heated by the heat source 18 to generate a refrigerant vapor, and is concentrated into the strong solution.

The high-temperature refrigerant vapor generated at this time flows into the heat transfer pipe of the second regenerator 7.

On the other hand, the medium-concentrated solution flowing into the second regenerator 7 is heated the condensation latent heat of the high-temperature refrigerant vapor in the heat transfer pipe of the second regenerator 7 to generate the refrigerant vapor, and is concentrated into the strong solution.

At this time, the generated refrigerant vapor and the high-temperature refrigerant condensed in the heat transfer pipe of the second regenerator 7 are combined and fed into the heat transfer pipe of the first regenerator 6 to concentrate the weak solution supplying to the first regenerator 6 described above.

Hereafter, the generated refrigerant vapor and the high-temperature refrigerant condensed in the heat transfer pipe of the second regenerator 7 are again cooled passing through the condensation refrigerant heat exchanger 12, and flow into the condenser 5.

Meanwhile, the refrigerant vapor generated in the first regenerator 6 and the refrigerant generated in the third regenerator 8 and the second regenerator 7 are condensed by the cooling water (see the two-dotted chain line) flowing in the heat transfer pipe of the condenser 5.

The condensed refrigerant liquid flows into the evaporator 1, 2 by the gravity and pressure difference to produce cold water required for cooling (see the line indicated by an increasing dot on the left side of the drawing).

The strong solution concentrated in the third regenerator 8 is combined with the strong solution concentrated in the second regenerator 7 via the third heat exchanger 11 and supplied to the second heat exchanger 10 to be cooled, and is combined with a small amount of the medium-concentrated solution concentrated in the first regenerator 6 and supplied to the first heat exchanger 9 to be cooled and then supplied to the upper absorber 3 to maintain the triple-effect absorption cycle.

Meanwhile, according to the present invention, during the initial operation or minimum load operation, the bypass pipe 102 and the switching valve 104 provided between the first solution branch pipe 31 and the second solution supply pipe 22 are turned on so that the weak solution does not flow (or minimum flow) into the first regenerator 6 and the weak solution is supplied to the second regenerator 7 and the third regenerator 8 to be regenerated to form double-effect cycle.

Accordingly, the present invention can improve the load response speed and the efficiency improvement until the steady-state operation according to the formation of the double-effect cycle.

The ON-OFF (or opening/closing degree adjustment) control of the switching valve 104 for controlling the triple-effect operation and the double-effect operation is performed under constant temperature and pressure based on the temperature and pressure of the third regenerator 8.

More specifically, when the operation of the entire apparatus is started, the switching valve 104 is turned ON to open the flow path of the bypass pipe 102 to form a double-effect cycle, and when the internal temperature of the third regenerator 8 reaches 120 to 140° C. or when the internal pressure of the third regenerator 8 reaches 400 to 700 mmHg, the switching valve 104 is turned OFF to shut off the flow path of the bypass pipe 102 to operate the triple-effect cycle.

In short, according to the present invention, the flow of the solution is supplied to the first regenerator 6 in the absorber 6 and concentrated, and the concentrated medium-concentrated solution is supplied simultaneously to the second regenerator 7 and the third regenerator 8 to form an anti-parallel flow cycle, and by a bypass pipe 102 provided between the first solution branch pipe 31 which is an inlet pipe of the first regenerator 6 and the second solution supply pipe 22 which is an outlet pipe of the first regenerator 6, the dual-effect operation can be performed during initial operation, the dilution, or minimum load operation.

According to the prior art, a pump should be added to the outlet of the second regenerator in view of the solution flow characteristics of the conventional reverse-flow type triple-effect absorption cycle, and there was a need for a complicated structure that constitutes a pipe for branching a part of the solution from the outlet of the first regenerator and the second regenerator to the strong solution recirculating to the absorber. In particular, since the solution flows in the present invention are configured in anti-parallel on a cycle, it is possible to overcome the problems of the prior art described above.

Therefore, the cooling capability of the triple absorption type refrigerator according to an embodiment of the present invention was 105.6 RT, and the COP was 1.744, which indicates that the refrigeration performance is improved as compared with the conventional absorption refrigerator.

Accordingly, the cooling capacity of the triple-effect absorption chilling apparatus according to an embodiment of the present invention is 105.6 RT, and the COP is 1.744, which is improved than that of the conventional absorption chiller.

At this time, the flow rate of the combustion gas supplied to the third regenerator 8 is 0.003905 kg per second, and the internal temperature of the third regenerator 8 is 195.8° C., and the discharge temperature of the combustion gas discharged through the third regenerator 8 is 168.9° C., and the inlet temperature of the cold water flowing through the heat transfer pipe of the evaporator 1,2 is 12° C., and the flow rate of the cold water is 16.8 kg per second, and the inlet temperature of the cooling water flowing through the heat transfer pipes of the absorber 3,4 and the condenser 5 is 32° C., and the flow rate of the cooling water is 27.8 kg per second.

As described above, as a basic technical ideas, the present invention provides a triple-effect absorption chilling apparatus that improves the load response speed while minimizing heat loss during the initial operation or minimum load operation.

And, it will be apparent to those skilled in the art that many other modifications and applications are possible within the scope of the basic technical idea of the present invention.

What is claimed is:

1. A triple-effect absorption chilling apparatus, the apparatus comprising:
   at least one evaporator;
   at least one absorber for absorbing refrigerant vapor generated from the evaporator to a dilute lithium bromide solution (hereinafter, referred to as 'weak solution');
   a first regenerator connected in series with the absorber and comprising a first heat transfer tube therein, wherein the weak solution supplied from the absorber is heated by the condensation latent heat of the refrigerant vapor in the first heat transfer pipe, and concentrated to medium-concentrated solution which is a thicker concentrated solution than the weak solution;
   a second regenerator connected in series with the first regenerator and comprising a second heat transfer tube therein, wherein the medium-concentrated solution supplied from the first regenerator is heated by the condensation latent heat of the refrigerant vapor in the second heat transfer pipe, and concentrated to strong solution which is a thicker concentrated solution than the medium-concentrated solution;
   a third regenerator connected in series with the first regenerator and connected in parallel with the second regenerator and comprising a heat source therein, wherein the medium-concentrated solution supplied from the first regenerator is heated by the heat source, and concentrated to strong solution which is a thicker concentrated solution than the medium-concentrated solution;
   a first solution pump for supplying the weak solution from the absorber to the first regenerator;
   a first solution supply pipe connected to the discharge outlet of the first solution pump and forming a flow path for supplying the weak solution to the first regenerator;
   a first solution branch pipe branched from the first solution supply pipe and connected to a first solution inlet port of the first regenerator;
   a first branch point where a start end of the first solution branch pipe is branched from the first solution supply pipe; and
   a first junction point to which the end of the first solution supply pipe and the first solution branch pipe are connected,
   wherein,
   the internal temperature of the third regenerator is higher than the internal temperature of the second regenerator, the internal temperature of the second regenerator is higher than the internal temperature of the first regenerator,
   a flow rate of the first weak solution flowing through the first solution supply pipe from the first branch point to the first junction point which is the end point is 10 to 20% of the flow rate of the weak solution discharged from the absorber, and
   a flow rate of the second weak solution flowing through the first solution branch pipe from the first branch point to the first solution inlet port which is the end point is 80 to 90% of the flow rate of the weak solution discharged from the absorber.

2. The apparatus of claim 1, further comprising:
   a second solution supply pipe connected from a first solution outlet port of the first regenerator to a second solution inlet port of the second regenerator;
   a second solution branch pipe branched from the second solution supply pipe and connected to a third solution inlet port of the third regenerator; and
   a first solution return pipe connected from a third solution outlet port of the third regenerator to the absorber,
   wherein the end of the first solution supply pipe connected to the first solution branch pipe and joined together.

3. The apparatus of claim 2, further comprising:
   a first heat exchanger arranged on the first solution branch pipe between the first branch point and the first junction point, wherein the first solution return pipe passes through the first heat exchanger and the weak solution flowing through the first solution branch pipe and the solution discharged from the third regenerator mutually heat-exchange in the first heat exchanger;
a second heat exchanger arranged on the second solution supply pipe, wherein the first solution return pipe passes through the second heat exchanger and the medium-concentrated solution flowing through the second solution supply pipe and the solution discharged from the third regenerator mutually heat-exchange in the second heat exchanger; and
a third heat exchanger arranged on the second solution branch pipe, wherein the first solution return pipe passes through the third heat exchanger and the medium-concentrated solution flowing through the second solution branch pipe and the solution discharged from the third regenerator mutually heat-exchange in the third heat exchanger,
wherein the internal temperature of the third heat exchanger is higher than the internal temperature of the second heat exchanger and the internal temperature of the second heat exchanger is higher than the internal temperature of the first heat exchanger, and
the third heat exchanger, the second heat exchanger, and the first heat exchanger are arranged in sequence on the first solution return pipe from the third regenerator to the absorber.

4. The apparatus of claim 3, further comprising:
a condensation refrigerant heat exchanger mounted on a refrigerant vapor discharge pipe passing through the third regenerator, the second regenerator, and the first regenerator sequentially to form a flow path for discharging a refrigerant vapor heated from the third regenerator and disposed between the condenser and the first regenerator, wherein the first solution supply pipe passes through the condensation refrigerant heat exchanger, and the fluid flowing in the refrigerant vapor discharge pipe and the fluid flowing in the first solution supply pipe mutually heat-exchange in the condensation refrigerant heat exchanger.

5. The apparatus of claim 3, further comprising:
a second solution pump mounted on the second solution supply pipe between the first regenerator and the second heat exchanger and transferring the weak solution from the first solution outlet port to the second heat exchanger;
a third solution pump mounted on the second solution supply pipe between the second heat exchanger and the second regenerator and transferring the medium-concentrated solution from the outlet of the second heat exchanger to the second regenerator;
a second branch point branched from the second solution supply pipe and disposed between the second solution pump and the inlet of the second heat exchanger;
a second solution return pipe forming a flow path for transferring a part of the medium-concentrated solution discharged from the second solution supply pipe to the absorber via the first heat exchanger, wherein one end of the second solution return pipe is connected to the second branch point and the other end of the second solution return pipe is connected to the first solution return pipe between the first heat exchanger and the second heat exchanger;
a third solution return pipe forming a flow path for transferring a part of the strong solution discharged from the second regenerator to the absorber sequentially through the second heat exchanger and the first heat exchanger, wherein the third solution return pipe is connected from the second solution outlet port to the first solution return pipe between the second heat exchanger and the third heat exchanger;
a third branch point branched from the second solution supply pipe and disposed between the third solution pump and the second regenerator and connected to the second solution branch pipe;
a fourth branch point disposed on the second solution branch pipe between the third branch point and the third heat exchanger; and
a third solution branch pipe of which one end of the third solution branch pipe is connected to the fourth branch point and the other end of the third solution branch pipe is connected to the second solution branch pipe between the outlet of the third treat exchanger and the third regenerator.

6. The apparatus of claim 5, characterized in that:
the flow rate of the first medium-concentrated solution flowing through the second solution return pipe from the second branch point to the first solution return pipe is 1% to 9% of the flow rate of the medium-concentrated solution discharged from the first solution outlet port, and
the flow rate of the second medium solution flowing through the second solution supply pipe from the second branch point to the third branch point which is an end point is 91% to 99% of the flow rate of the medium-concentrated solution discharged from the first solution outlet port.

7. The apparatus of claim 5, characterized in that:
the flow rate of the third medium-concentrated solution flowing through the second solution supply pipe from the third branch point to the second solution inlet port is 40% to 50% of the flow rate of the second medium-concentrated solution,
the flow rate of the fourth medium-concentrated solution flowing through the second solution branch pipe from the third branch point to the third solution inlet port is 45% to 55% of the flow rate of the second medium-concentrated solution, and
the second medium-concentrated solution flows through the second solution supply pipe from the second branch point to the third branch point, which is the end point.

8. A triple-effect absorption chilling apparatus, the apparatus comprising:
at least one evaporator;
at least one absorber for absorbing refrigerant vapor generated from the evaporator to a dilute lithium bromide solution (hereinafter, referred to as 'weak solution');
a first regenerator connected in series with the absorber and comprising a first heat transfer tube therein, wherein the weak solution supplied from the absorber is heated by the condensation latent heat of the refrigerant vapor in the first heat transfer pipe, and concentrated to medium-concentrated solution which is a thicker concentrated solution than the weak solution;
a bypass pipe configured to connect the inlet pipe connecting the absorber and the first regenerator and the outlet pipe discharging the medium-concentrated solution from the first regenerator;
a switching valve mounted on the bypass pipe and controlled so as to maintain or shut off the connection of the inlet pipe and the outlet pipe with each other;
a second regenerator connected in series with the first regenerator and comprising a second heat transfer tube therein, wherein the medium-concentrated solution supplied from the first regenerator is heated by the condensation latent heat of the refrigerant vapor in the second heat transfer pipe, and concentrated to strong solution which is a thicker concentrated solution than the medium-concentrated solution; and a third regenerator connected in series with the first regenerator and connected in parallel with the second regenerator and comprising a heat source therein, wherein the medium-concentrated solution supplied from the first regenerator is heated by the heat source, and concentrated to strong solution which is a thicker concentrated solution than the medium-concentrated solution, wherein, the internal temperature of the third regenerator is higher than the internal temperature of the second regenerator, and the internal temperature of the second regenerator is higher than the internal temperature of the first regenerator, the switching valve keeps ON state until the third regenerator reaches a predetermined temperature and pressure to block the weak solution from flowing into the first regenerator, and when the internal temperature of the third regenerator reaches 120 to 140° C. and the internal pressure of the third regenerator reaches 400 to 700 mmHg, the switching valve is turned OFF to block the flow path of the bypass pipe.

* * * * *